United States Patent
Lin et al.

(10) Patent No.: US 8,554,703 B1
(45) Date of Patent: Oct. 8, 2013

(54) ANOMALY DETECTION

(75) Inventors: Wei-Hao Lin, New York, NY (US); Travis H. K. Green, New York, NY (US); Robert Kaplow, New York, NY (US); Gang Fu, Kearny, NJ (US); Gideon S. Mann, New York, NY (US)

(73) Assignee: Google Inc., Mountain View, CA (US)

( * ) Notice: Subject to any disclaimer, the term of this patent is extended or adjusted under 35 U.S.C. 154(b) by 278 days.

(21) Appl. No.: 13/198,900

(22) Filed: Aug. 5, 2011

(51) Int. Cl.
*G06F 15/18* (2006.01)

(52) U.S. Cl.
USPC .......................................................... 706/12

(58) Field of Classification Search
USPC .......................................................... 706/12
See application file for complete search history.

(56) References Cited

U.S. PATENT DOCUMENTS

| | | | |
|---|---|---|---|
| 7,349,919 | B2 | 3/2008 | Russell et al. |
| 8,438,122 | B1 * | 5/2013 | Mann et al. ...................... 706/12 |
| 2003/0212851 | A1 * | 11/2003 | Drescher et al. .............. 711/100 |
| 2005/0234753 | A1 | 10/2005 | Pinto et al. |
| 2008/0288427 | A1 * | 11/2008 | Barson et al. ................... 706/25 |
| 2009/0106178 | A1 | 4/2009 | Chu |
| 2011/0202487 | A1 * | 8/2011 | Koshinaka ....................... 706/12 |
| 2011/0289025 | A1 * | 11/2011 | Yan et al. ......................... 706/12 |
| 2012/0123987 | A1 * | 5/2012 | Deshpande et al. ............. 706/46 |
| 2012/0323835 | A1 * | 12/2012 | Deshpande et al. ............. 706/46 |

OTHER PUBLICATIONS

Duchi, John, et al., "Boosting with Structural Sparsity", 2009, cs.berkeley.edu [online] [Retrieved on Jan. 25, 2011]. Retrieved from the Internet: <URL: http://www.cs.berkeley.edu/~jduchi/projects/DuchiSi09d.pdf>, 41 pages.

Duchi, John, et al., "Boosting with Structural Sparsity", Proceedings of the 26th International Conference on Machine Learning, Montreal, Canada, 2009, cs.berkeley.edu [online] [Retrieved on Jan. 25, 2011]. Retrieved from the Internet: <URL: http://www.cs.berkeley.edu/~jduchi/projects/DuchiSi09a.pdf>, 8 pages.

R-Project web pages, 190 pages [online]. [Retrieved on May 18, 2010]. Retrieved from the Internet: <URL: http://www.r-project.org/>, 190 pages.

Uclassify web pages, [online] [Retrieved on May 18, 2010]. Retrieved from the Internet: <URL: http://www.uclassify.com>, 16 pages.

Zementis web pages [online] [Retrieved on May 18, 2010]. Retrieved from the Internet: <URL: http://www.zementis.com>, 34 pages.

(Continued)

*Primary Examiner* — Jeffrey A Gaffin
*Assistant Examiner* — David H Kim
(74) *Attorney, Agent, or Firm* — Fish & Richardson P.C.

(57) ABSTRACT

Methods, systems, and apparatus, including computer programs encoded on computer storage media, for anomaly detection. One of the methods includes receiving training data for updating an updateable trained first predictive model. The method includes inputting the training data into a trained second predictive model and generating predictive output data. The method includes based on the predictive output data, detecting an anomaly in the training data as compared to previously received training data. The method includes generating a retrained first predictive model based on the updateable trained first predictive model, a training function and training data that includes the received training data and previously received training data, wherein the received training data is weighted differently than the previously received training data based on the detected anomaly.

21 Claims, 8 Drawing Sheets

(56) References Cited

OTHER PUBLICATIONS

Weiss, Integrating Real-Time Predictive Analytics into SAP Applications [online], Dec. 30, 2009 [retrieved on Sep. 29, 2011], Retrieved from the Internet: ,URL:http://www.sdn.sap.com/irj/scn/go/portal/prtroot/docs/library/uuid/a07faefd-61d7-2c10-bba6-89ac5ffc302c?QuickLink=index&overridelayout=true>, 1 page.

Hutter, et al., "Performance Prediction and Automated Tuning of Randomized and Parametric Algorithms,", Principles and Practice of Constraint Programing, Lecture Notes in Computer Science, 2006, 15 pages.

SAS Rapid Predictive Modeler, Overview, 2010, 4 pages.

Postema, et al., "A Decision Support Tool for Tuning Parameters in a Machine Learning Algorithm", Nanyang Techonological University, 1997, 9 pages.

"Active learning (machine learning)," Wikipedia, the free encyclopedia, [online] [retrieved on Sep. 8, 2011]. Retrieved from the Internet: http://en.wikipedia.org/wiki/Active learning (machine learning), 3 pages.

* cited by examiner

ANOMALY DETECTION

TECHNICAL FIELD

This specification relates to anomaly detection.

BACKGROUND

Predictive analytics generally refers to techniques for extracting information from data to build a model that can predict an output from a given input. Predicting an output can include predicting future trends or behavior patterns or performing sentiment analysis, to name a few examples. Various types of predictive models can be used to analyze data and generate predictive outputs. Typically, a predictive model is trained with training data that includes input data and output data that mirror the form of input data that will be entered into the predictive model and the desired predictive output, respectively.

Systems detect anomalies by detecting patterns in a given data set that do not conform to an established normal behavior. Anomaly detection has been used for intrusion detection, fraud detection, and health system monitoring.

SUMMARY

This document describes techniques for anomaly detection.

In general, one innovative aspect of the subject matter described in this specification can be embodied in methods that include the actions of receiving training data for updating an updateable trained first predictive model. The methods include the actions of inputting the training data into a trained second predictive model and generating predictive output data. The methods include the actions of based on the predictive output data, detecting an anomaly in the training data as compared to previously received training data. The methods also include the actions of generating a retrained first predictive model based on the updateable trained first predictive model, a training function and training data that includes the received training data and previously received training data, wherein the received training data is weighted differently than the previously received training data based on the detected anomaly.

In general, another innovative aspect of the subject matter described in this specification can be embodied in methods that include the actions of receiving training data for updating an updateable trained first predictive model. The methods include the actions of receiving a predictive request for an updateable trained first predictive model, the predictive request including input data. The methods also include the actions of inputting the input data into a trained second predictive model and generating predictive output data, the trained second predictive model trained to detect an anomaly in input data as compared to previously received training data. The methods also include the actions of based on the predictive output data, detecting an anomaly in the input data as compared to the previously received input data. The methods also include the actions of receiving training data for updating the updateable trained first predictive model. The methods also include the actions of generating a retrained first predictive model based on the updateable trained first predictive model, a training function and training data that includes the received training data and previously received training data, wherein the received training data is weighted differently than the previously received training data based on the detected anomaly.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The received training data may include a set of records, each record may include an input and a desired output. Detecting an anomaly in the received training data may include detecting an anomaly in a threshold number of records of the set of records. Detecting an anomaly in the received training data may include comparing a measure of the similarity between the received training data and the previously received training data to a threshold. The methods may include the actions of receiving a predictive request and input data from a client computing system. The methods may include the actions of generating a predictive output using the retrained first predictive model and the input data. The methods may include the actions of sending the predictive output to the client computing system. The methods may include the actions of generating a retrained second predictive model based on the updateable trained first predictive model, the training function and training data that includes the received training data and previously received training data, wherein the received training data is weighted the same as the previously received training data based on the detected anomaly. The methods may include the actions of generating a first efficiency score for the retrained first predictive model. The methods may include the actions of generating a second efficiency score for the retrained second predictive model. The methods may include the actions of electing to use the retrained first predictive model in response to the first efficiency score being greater than the second efficiency score.

Particular embodiments of the subject matter described in this specification can be implemented so as to realize one or more of the following anomalies in data can be identified, accuracy of predictive models can be increased, and trends and changes in behavior can be detected and accounted for.

DESCRIPTION OF DRAWINGS

Like reference symbols in the various drawings indicate like elements.

DETAILED DESCRIPTION

Figure 1:
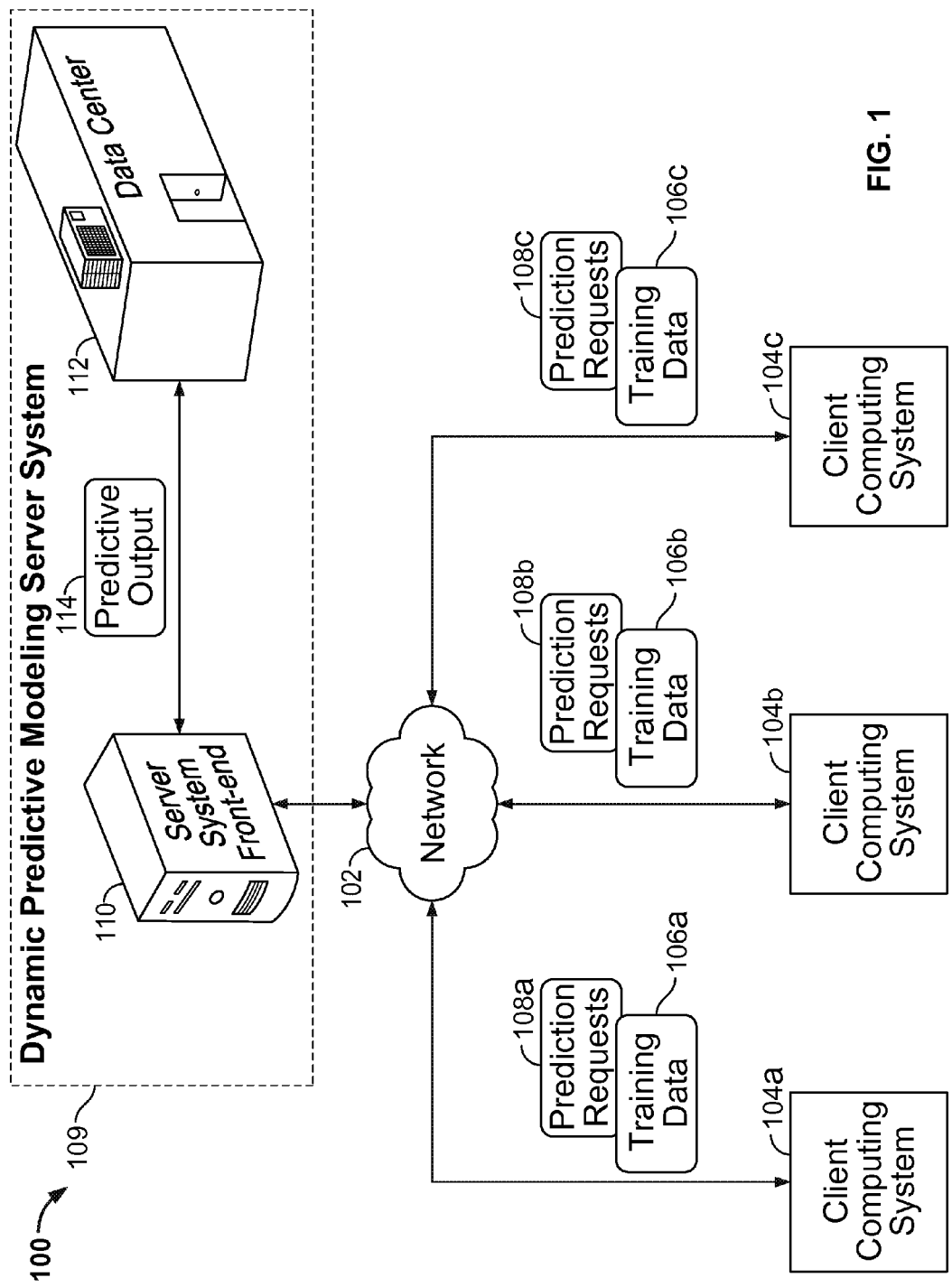
FIG. 1 is a schematic representation of an example system that provides a predictive analytic platform.

FIG. 1 is a schematic representation of a system that provides a predictive analytic platform. The system 100 includes multiple client computing systems 104a-c that can communicate with a predictive modeling server system 109. In the example shown, the client computing systems 104a-c can communicate with a server system front end 110 by way of a network 102. The network 102 can include one or more local area networks (LANs), a wide area network (WAN), such as the Internet, a wireless network, such as a cellular network, or a combination of all of the above. The server system front end 110 is in communication with, or is included within, one or more data centers, represented by the data center 112. A data center 112 generally is a large numbers of computers, housed in one or more buildings that are typically capable of managing large volumes of data.

A client entity—an individual or a group of people or a company, for example—may desire a trained predictive model that can receive input data from a client computing system 104a belonging to or under the control of the client entity and generate a predictive output. To train a particular predictive model can require a significant volume of training data, for example, one or more gigabytes of data. The client computing system 104a may be unable to efficiently manage such a large volume of data. Further, selecting and tuning an effective predictive model from the variety of available types of models can require skill and expertise that an operator of the client computing system 104a may not possess.

The system 100 described here allows training data 106a to be uploaded from the client computing system 104a to the predictive modeling server system 109 over the network 102. The training data 106a can include initial training data, which may be a relatively large volume of training data the client entity has accumulated, for example, if the client entity is a first-time user of the system 100. The training data 106a can also include new training data that can be uploaded from the client computing system 104a as additional training data becomes available. The client computing system 104a may upload new training data whenever the new training data becomes available on an ad hoc basis, periodically in batches, in a batch once a certain volume has accumulated, or otherwise.

The server system front end 110 can receive, store and manage large volumes of data using the data center 112. One or more computers in the data center 112 can run software that uses the training data to estimate the effectiveness of multiple types of predictive models and make a selection of a trained predictive model to be used for data received from the particular client computing system 104a. The selected model can be trained and the trained model made available to users who have access to the predictive modeling server system 109 and, optionally, permission from the client entity that provided the training data for the model. Access and permission can be controlled using any conventional techniques for user authorization and authentication and for access control, if restricting access to the model is desired. The client computing system 104a can transmit prediction requests 108a over the network. The selected trained model executing in the data center 112 receives the prediction request, input data and request for a predictive output, and generates the predictive output 114. The predictive output 114 can be provided to the client computing system 104a, for example, over the network 102.

Advantageously, when handling large volumes of training data and/or input data, the processes can be scaled across multiple computers at the data center 112. The predictive modeling server system 109 can automatically provision and allocate the required resources, using one or more computers as required. An operator of the client computing system 104a is not required to have any special skill or knowledge about predictive models. The training and selection of a predictive model can occur "in the cloud", i.e., over the network 102, thereby lessening the burden on the client computing system's processor capabilities and data storage, and also reducing the required client-side human resources.

The term client computing system is used in this description to refer to one or more computers, which may be at one or more physical locations, that can access the predictive modeling server system. The data center 112 is capable of handling large volumes of data, e.g., on the scale of terabytes or larger, and as such can serve multiple client computing systems. For illustrative purposes, three client computing systems 104a-c are shown, however, scores of client computing systems can be served by such a predictive modeling server system 109.

Figure 2:
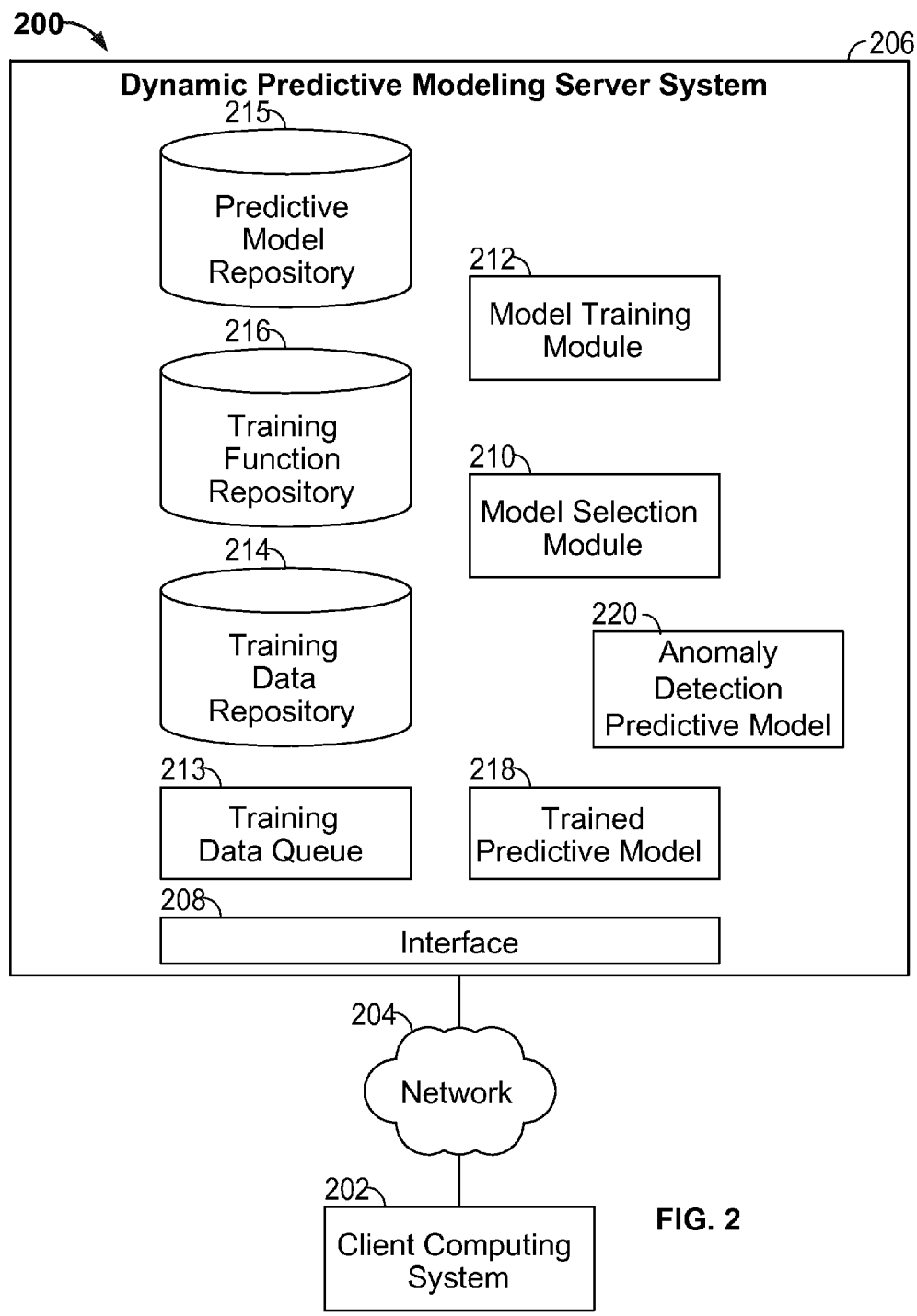
FIG. 2 is a schematic block diagram showing an example system for providing a dynamic predictive analytic platform over a network.

FIG. 2 is a schematic block diagram showing a system 200 for providing a dynamic predictive analytic platform over a network. For illustrative purposes, the system 200 is shown with one client computing system 202 communicating over a network 204 with a predictive modeling server system 206. However, it should be understood that the predictive modeling server system 206, which can be implemented using multiple computers that can be located in one or more physical locations, can serve multiple client computing systems. In the example shown, the predictive modeling server system includes an interface 208. In some implementations the interface 208 can be implemented as one or more modules adapted to interface with components included in the predictive modeling server system 206 and the network 204, for example, the training data queue 213, the training data repository 214, the model selection module 210 and/or the predictive model repository 218.

Figure 3:
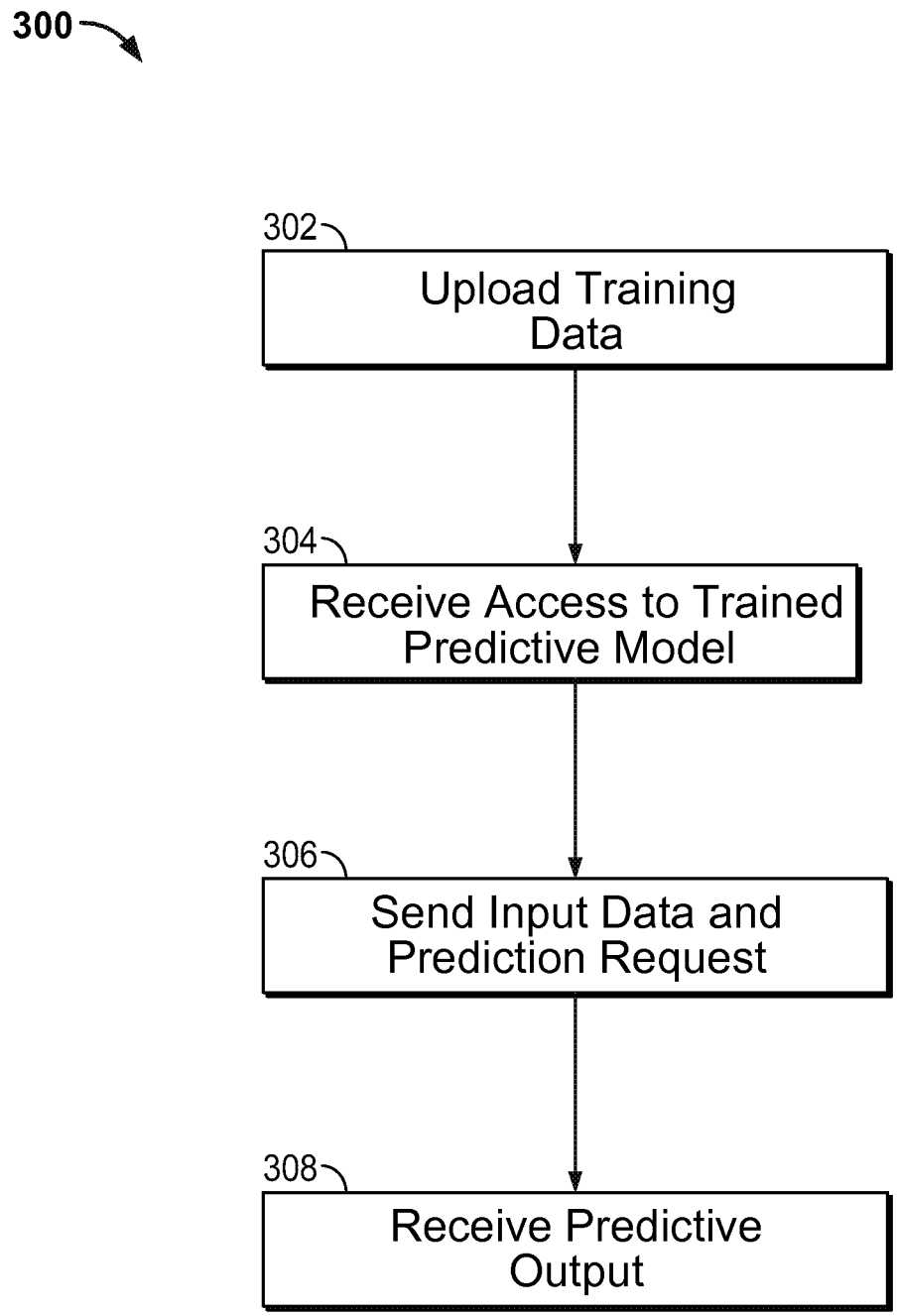
FIG. 3 is a flowchart showing an example process for using the predictive analytic platform from the perspective of the client computing system.

FIG. 3 is a flowchart showing an example process 300 for using the predictive analytic platform from the perspective of the client computing system 202. The process 300 can be carried out by the client computing system 202 when the corresponding client entity is uploading the initial training data to the system 206. The client computing system 202 uploads training data (i.e., the initial training data) to the predictive modeling server system 206 over the network 204 (Step 302). In some implementations, the initial training data is uploaded in bulk (e.g., a batch) by the client computing system 202. In other implementations, the initial training data is uploaded incrementally by the client computing system 202 until a threshold volume of data has been received that together forms the "initial training data". The size of the threshold volume can be set by the system 206, the client computing system 202 or otherwise determined. In response, the client computing system 202 receives access to a trained predictive model, for example, trained predictive model 218 (Step 304).

In the implementations shown, the trained predictive model 218 is not itself provided. The trained predictive model 218 resides and executes at a location remote from the client computing system 202. For example, referring back to FIG. 1, the trained predictive model 218 can reside and execute in the data center 112, thereby not using the resources of the client computing system 202. Once the client computing system 202 has access to the trained predictive model 218, the client computing system can send input data and a prediction request to the trained predictive model (Step 306). In response, the client computing system receives a predictive output generated by the trained predictive model from the input data (Step 308).

From the perspective of the client computing system 202, training and use of a predictive model is relatively simple. The training and selection of the predictive model, tuning of the hyper-parameters and features used by the model (to be described below) and execution of the trained predictive model to generate predictive outputs is all done remote from the client computing system 202 without expending client computing system resources. The amount of training data provided can be relatively large, e.g., gigabytes or more, which is often an unwieldy volume of data for a client entity.

Figure 4:
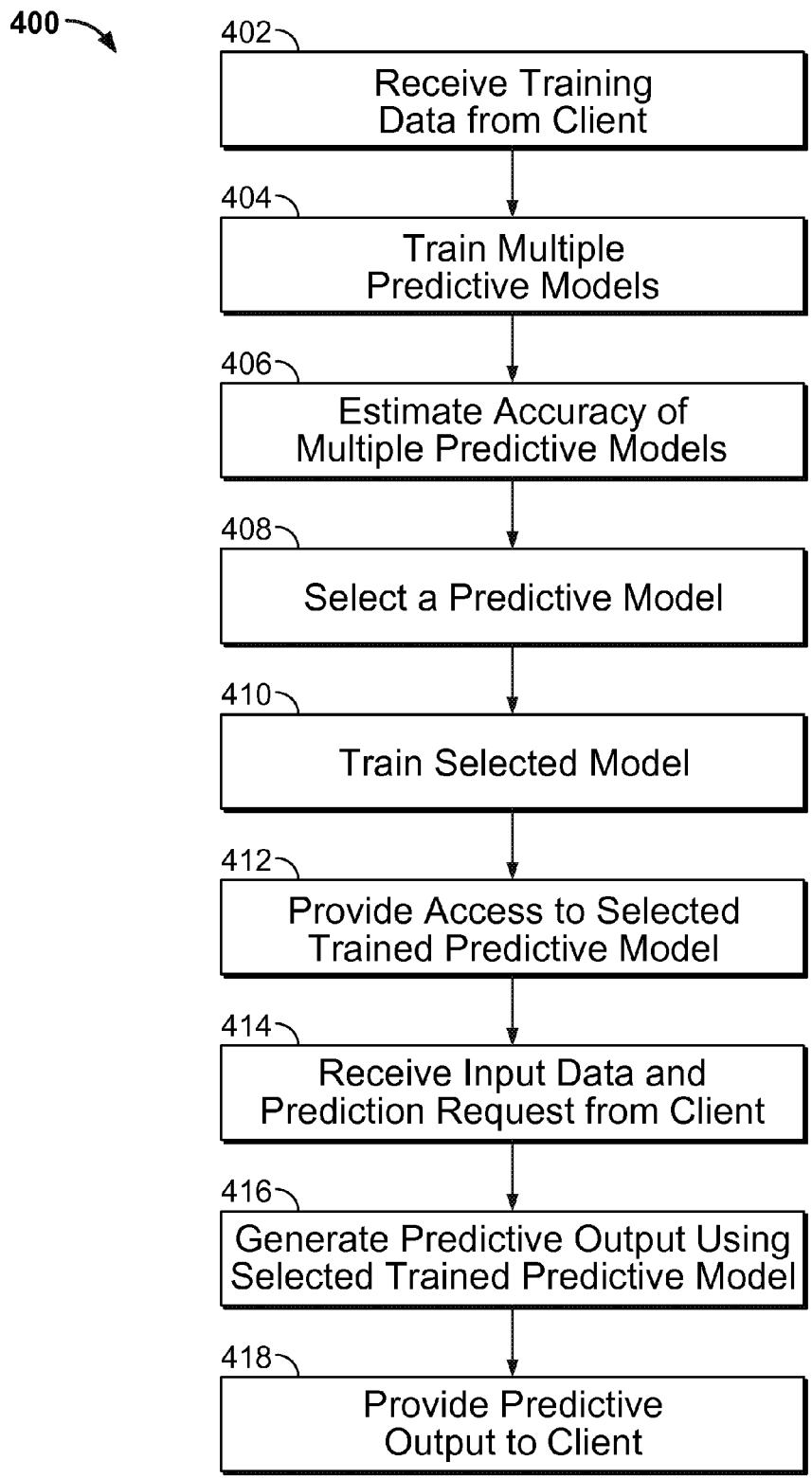
FIG. 4 is a flowchart showing an example process for serving a client computing system using the predictive analytic platform.

The predictive modeling server system 206 will now be described in more detail with reference to the flowchart shown in FIG. 4. FIG. 4 is a flowchart showing an example process 400 for serving a client computing system using the predictive analytic platform. The process 400 is carried out to provide access of a selected trained predictive model to the client computing system, which trained predictive model has been trained using initial training data. Providing accessing to the client computing system of a predictive model that has been retrained using new training data (i.e., training data available after receiving the initial training data) is described below in reference to FIGS. 5 and 6.

Referring to FIG. 4, training data (i.e., initial training data) is received from the client computing system (Step 402). For example, the client computing system 202 can upload the training data to the predictive modeling server system 206 over the network 204 either incrementally or in bulk (i.e., as batch). As describe above, if the initial training data is uploaded incrementally, the training data can accumulate until a threshold volume is received before training of predictive models is initiated. The training data can be in any convenient form that is understood by the modeling server system 206 to define a set of records, where each record includes an input and a corresponding desired output. By way of example, the training data can be provided using a comma-separated value format, or a sparse vector format. In another example, the client computing system 202 can specify a protocol buffer definition and upload training data that complies with the specified definition.

The process 400 and system 200 can be used in various different applications. Some examples include (without limitation) making predictions relating to customer sentiment, transaction risk, species identification, message routing, diagnostics, churn prediction, legal docket classification, suspicious activity, work roster assignment, inappropriate content, product recommendation, political bias, uplift marketing, e-mail filtering and career counseling. For illustrative purposes, the process 400 and system 200 will be described using an example that is typical of how predictive analytics are often used. In this example, the client computing system 202 provides a web-based online shopping service. The training data includes multiple records, where each record provides the online shopping transaction history for a particular customer. The record for a customer includes the dates the customer made a purchase and identifies the item or items purchased on each date. The client computing system 202 is interested in predicting a next purchase of a customer based on the customer's online shopping transaction history.

Various techniques can be used to upload a training request and the training data from the client computing system 202 to the predictive modeling server system 206. In some implementations, the training data is uploaded using an HTTP web service. The client computing system 202 can access storage objects using a RESTful API to upload and to store their training data on the predictive modeling server system 206. In other implementations, the training data is uploaded using a hosted execution platform, e.g., AppEngine available from Google Inc. of Mountain View, Calif. The predictive modeling server system 206 can provide utility software that can be used by the client computing system 202 to upload the data. In some implementations, the predictive modeling server system 206 can be made accessible from many platforms, including platforms affiliated with the predictive modeling server system 206, e.g., for a system affiliated with Google, the platform could be a Google App Engine or Apps Script (e.g., from Google Spreadsheet), and platforms entirely independent of the predictive modeling server system 206, e.g., a desktop application. The training data can be large, e.g., many gigabytes. The predictive modeling server system 206 can include a data store, e.g., the training data repository 214, operable to store the received training data.

The predictive modeling server system 206 includes a repository of training functions for various predictive models, which in the example shown are included in the training function repository 216. At least some of the training functions included in the repository 216 can be used to train an "updateable" predictive model. An updateable predictive model refers to a trained predictive model that was trained using a first set of training data (e.g., initial training data) and that can be used together with a new set of training data and a training function to generate a "retrained" predictive model. The retrained predictive model is effectively the initial trained predictive model updated with the new training data. One or more of the training functions included in the repository 216 can be used to train "static" predictive models. A static predictive model refers to a predictive model that is trained with a batch of training data (e.g., initial training data) and is not updateable with incremental new training data. If new training data has become available, a new static predictive model can be trained using the batch of new training data, either alone or merged with an older set of training data (e.g., the initial training data) and an appropriate training function.

Some examples of training functions that can be used to train a static predictive model include (without limitation): regression (e.g., linear regression, logistic regression), classification and regression tree, multivariate adaptive regression spline and other machine learning training functions (e.g., Naïve Bayes, k-nearest neighbors, Support Vector Machines, Perceptron). Some examples of training functions that can be used to train an updateable predictive model include (without limitation) Online Bayes, Rewritten Winnow, Support Vector Machine (SVM) Analogue, Maximum Entrophy (MaxEnt) Analogue, Gradient based (FOBOS) and AdaBoost with Mixed Norm Regularization. The training function repository 216 can include one or more of these example training functions.

In some scenarios, a recency weighted predictive model can be trained. In general, a recency weighted predictive model is a predictive model that is trained giving increased significance to more recent training data data as compared to earlier received training data. A recency weighted predictive model can be used to improve predictive output in response to a change in input data. By way of illustrative example, a trained predictive model that is used to predict a user behavior can adapt to changes that can affect user behavior. For example, in the spring, individuals change from purchasing winter boots to purchasing sandals. A recency weighted predictive model can reflect this change more rapidly than a conventionally trained predictive model.

Referring again to FIG. 4, multiple predictive models, which can be all or a subset of the available predictive models, are trained using some or all of the training data (Step 404). In the example predictive modeling server system 206, a model training module 212 is operable to train the multiple predictive models. The multiple predictive models include one or more updateable predictive models and can include one or more static predictive models.

The client computing system 202 can send a training request to the predictive modeling server system 206 to initiate the training of a model. For example, a GET or a POST request could be used to make a training request to a URL. A training function is applied to the training data to generate a set of parameters. These parameters form the trained predictive model. For example, to train (or estimate) a Naïve Bayes model, the method of maximum likelihood can be used. A given type of predictive model can have more than one training function. For example, if the type of predictive model is a linear regression model, more than one different training function for a linear regression model can be used with the same training data to generate more than one trained predictive model.

For a given training function, multiple different hyper-parameter configurations can be applied to the training function, again generating multiple different trained predictive models. Therefore, in the present example, where the type of predictive model is a linear regression model, changes to an L1 penalty generate different sets of parameters. Additionally, a predictive model can be trained with different features, again generating different trained models. The selection of features, i.e., feature induction, can occur during multiple iterations of computing the training function over the training data. For example, feature conjunction can be estimated in a forward stepwise fashion in a parallel distributed way enabled by the computing capacity of the predictive modeling server system, i.e., the data center.

Considering the many different types of predictive models that are available, and then that each type of predictive model may have multiple training functions and that multiple hyper-parameter configurations and selected features may be used for each of the multiple training functions, there are many different trained predictive models that can be generated. Depending on the nature of the input data to be used by the trained predictive model to predict an output, different trained predictive models perform differently. That is, some can be more effective than others.

The effectiveness of each of the trained predictive models is estimated (Step 406). For example, a model selection module 210 is operable to estimate the effectiveness of each trained predictive model. In some implementations, cross-validation is used to estimate the effectiveness of each trained predictive model. In a particular example, a 10-fold cross-validation technique is used. Cross-validation is a technique where the training data is partitioned into sub-samples. A number of the sub-samples are used to train an untrained predictive model, and a number of the sub-samples (usually one) is used to test the trained predictive model. Multiple rounds of cross-validation can be performed using different sub-samples for the training sample and for the test sample. K-fold cross-validation refers to portioning the training data into K sub-samples. One of the sub-samples is retained as the test sample, and the remaining K−1 sub-samples are used as the training sample. K rounds of cross-validation are performed, using a different one of the sub-samples as the test sample for each round. The results from the K rounds can then be averaged, or otherwise combined, to produce a cross-validation score. 10-fold cross-validation is commonly used.

In some implementations, the effectiveness of each trained predictive model is estimated by performing cross-validation to generate a cross-validation score that is indicative of the accuracy of the trained predictive model, i.e., the number of exact matches of output data predicted by the trained model when compared to the output data included in the test sub-sample. In other implementations, one or more different metrics can be used to estimate the effectiveness of the trained model. For example, cross-validation results can be used to indicate whether the trained predictive model generated more false positive results than true positives and ignores any false negatives.

In other implementations, techniques other than, or in addition to, cross-validation can be used to estimate the effectiveness. In one example, the resource usage costs for using the trained model can be estimated and can be used as a factor to estimate the effectiveness of the trained model.

In some implementations, the predictive modeling server system 206 operates independently from the client computing system 202 and selects and provides the trained predictive model 218 as a specialized service. The expenditure of both computing resources and human resources and expertise to select the untrained predictive models to include in the training function repository 216, the training functions to use for the various types of available predictive models, the hyper-parameter configurations to apply to the training functions and the feature-inductors all occurs server-side. Once these selections have been completed, the training and model selection can occur in an automated fashion with little or no human intervention, unless changes to the server system 206 are desired. The client computing system 202 thereby benefits from access to a trained predictive model 218 that otherwise might not have been available to the client computing system 202, due to limitations on client-side resources.

Referring again to FIG. 4, each trained model is assigned a score that represents the effectiveness of the trained model. As discussed above, the criteria used to estimate effectiveness can vary. In the example implementation described, the criterion is the accuracy of the trained model and is estimated using a cross-validation score. Based on the scores, a trained predictive model is selected (Step 408). In some implementations, the trained models are ranked based on the value of their respective scores, and the top ranking trained model is chosen as the selected predictive model. Although the selected predictive model was trained during the evaluation stage described above, training at that stage may have involved only a sample of the training data, or not all of the training data at one time. For example, if k-fold cross-validation was used to estimate the effectiveness of the trained model, then the model was not trained with all of the training data at one time, but rather only K−1 partitions of the training data. Accordingly, if necessary, the selected predictive model is fully trained using the training data (e.g., all K partitions) (Step 410), for example, by the model training module 212. A trained model (i.e., "fully trained" model) is thereby generated for use in generating predictive output, e.g., trained predictive model 218. The trained predictive model 218 can be stored by the predictive modeling server system 206. That is, the trained predictive model 218 can reside and execute in a data center that is remote from the client computing system 202.

Of the multiple trained predictive models that were trained as described above, some or all of them can be stored in the predictive model repository 215. Each trained predictive model can be associated with its respective effectiveness score. One or more of the trained predictive models in the repository 215 are updateable predictive models. In some implementations, the predictive models stored in the repository 215 are trained using the entire initial training data, i.e., all K partitions and not just K−1 partitions. In other implementations, the trained predictive models that were generated in the evaluation phase using K−1 partitions are stored in the repository 215, so as to avoid expending additional resources to recompute the trained predictive models using all K partitions.

Access to the trained predictive model is provided (Step 412) rather than the trained predictive model itself. In some implementations, providing access to the trained predictive model includes providing an address to the client computing system 202 or other user computing platform that can be used to access the trained model; for example, the address can be a URL (Universal Resource Locator). Access to the trained predictive model can be limited to authorized users. For example, a user may be required to enter a user name and password that has been associated with an authorized user before the user can access the trained predictive model from a computing system, including the client computing system 202. If the client computing system 202 desires to access the trained predictive model 218 to receive a predictive output, the client computing system 202 can transmit to the URL a request that includes the input data. The predictive modeling server system 206 receives the input data and prediction request from the client computing system 202 (Step 414). In response, the input data is input to the trained predictive model 218 and a predictive output generated by the trained model (Step 416). The predictive output is provided; it can be provided to the client computing system (Step 418).

In some implementations, where the client computing system is provided with a URL to access the trained predictive model, input data and a request to the URL can be embedded in an HTML document, e.g., a webpage. In one example, JavaScript can be used to include the request to the URL in the HTML document. Referring again to the illustrative example above, when a customer is browsing on the client computing system's web-based online shopping service, a call to the URL can be embedded in a webpage that is provided to the customer. The input data can be the particular customer's online shopping transaction history. Code included in the webpage can retrieve the input data for the customer, which input data can be packaged into a request that is sent in a request to the URL for a predictive output. In response to the request, the input data is input to the trained predictive model and a predictive output is generated. The predictive output is provided directly to the customer's computer or can be returned to the client computer system, which can then forward the output to the customer's computer. The client computing system 202 can use and/or present the predictive output result as desired by the client entity. In this particular example, the predictive output is a prediction of the type of product the customer is most likely to be interested in purchasing. If the predictive output is "blender", then, by way of example, an HTML document executing on the customer's computer may include code that in response to receiving the predictive output cause to display on the customer's computer one or more images and/or descriptions of blenders available for sale on the client computing system's online shopping service. This integration is simple for the client computing system, because the interaction with the predictive modeling server system can use a standard HTTP protocol, e.g. GET or POST can be used to make a request to a URL that returns a JSON (JavaScript Object Notation) encoded output. The input data also can be provided in JSON format.

The customer using the customer computer can be unaware of these operations, which occur in the background without necessarily requiring any interaction from the customer. Advantageously, the request to the trained predictive model can seamlessly be incorporated into the client computer system's web-based application, in this example an online shopping service. A predictive output can be generated for and received at the client computing system (which in this example includes the customer's computer), without expending client computing system resources to generate the output.

In other implementations, the client computing system can use code (provided by the client computing system or otherwise) that is configured to make a request to the predictive modeling server system 206 to generate a predictive output using the trained predictive model 218. By way of example, the code can be a command line program (e.g., using cURL) or a program written in a compiled language (e.g., C, C++, Java) or an interpreted language (e.g., Python). In some implementations, the trained model can be made accessible to the client computing system or other computer platforms by an API through a hosted development and execution platform, e.g., Google App Engine.

In the implementations described above, the trained predictive model 218 is hosted by the predictive modeling server system 206 and can reside and execute on a computer at a location remote from the client computing system 202. However, in some implementations, once a predictive model has been selected and trained, the client entity may desire to download the trained predictive model to the client computing system 202 or elsewhere. The client entity may wish to generate and deliver predictive outputs on the client's own computing system or elsewhere. Accordingly, in some implementations, the trained predictive model 218 is provided to a client computing system 202 or elsewhere, and can be used locally by the client entity.

Components of the client computing system 202 and/or the predictive modeling system 206, e.g., the model training module 212, model selection module 210 and trained predictive model 218, can be realized by instructions that upon execution cause one or more computers to carry out the operations described above. Such instructions can comprise, for example, interpreted instructions, such as script instructions, e.g., JavaScript or ECMAScript instructions, or executable code, or other instructions stored in a computer readable medium. The components of the client computing system 202 and/or the predictive modeling system 206 can be implemented in multiple computers distributed over a network, such as a server farm, in one or more locations, or can be implemented in a single computer device.

As discussed above, the predictive modeling server system 206 can be implemented "in the cloud". In some implementations, the predictive modeling server system 206 provides a web-based service. A web page at a URL provided by the predictive modeling server system 206 can be accessed by the client computing system 202. An operator of the client computing system 202 can follow instructions displayed on the web page to upload training data "to the cloud", i.e., to the predictive modeling server system 206. Once completed, the operator can enter an input to initiate the training and selecting operations to be performed "in the cloud", i.e., by the predictive modeling server system 206, or these operations can be automatically initiated in response to the training data having been uploaded.

The operator of the client computing system 202 can access the one or more trained models that are available to the client computing system 202 from the web page. For example, if more than one set of training data (e.g., relating to different types of input that correspond to different types of predictive output) had been uploaded by the client computing system 202, then more than one trained predictive model may be available to the particular client computing system. Representations of the available predictive models can be displayed, for example, by names listed in a drop down menu or by icons displayed on the web page, although other representations can be used. The operator can select one of the available predictive models, e.g., by clicking on the name or icon. In response, a second web page (e.g., a form) can be displayed that prompts the operator to upload input data that can be used by the selected trained model to provide predictive output data (in some implementations, the form can be part of the first web page described above). For example, an input field can be provided, and the operator can enter the input data into the field. The operator may also be able to select and upload a file (or files) from the client computing system 202 to the predictive modeling server system 206 using the form, where the file or files contain the input data. In response, the selected predicted model can generate predictive output based on the input data provided, and provide the predictive output to the client computing system 202 either on the same web page or a different web page. The predictive output can be provided by displaying the output, providing an output file or otherwise.

In some implementations, the client computing system 202 can grant permission to one or more other client computing systems to access one or more of the available trained predictive models of the client computing system. The web page used by the operator of the client computing system 202 to access the one or more available trained predictive models can be used (either directly or indirectly as a link to another web page) by the operator to enter information identifying the one or more other client computing systems being granted access and possibly specifying limits on their accessibility. Conversely, if the client computing system 202 has been granted access by a third party (i.e., an entity controlling a different client computing system) to access one or more of the third party's trained models, the operator of the client computing system 202 can access the third party's trained models using the web page in the same manner as accessing the client computing system's own trained models (e.g., by selecting from a drop down menu or clicking an icon).

Trained predictive models can be used to detect anomalies in patterns of data. An anomaly detection predictive model 220 can be trained, as described above, using input data that has been indicated to be normal The modeling server system 206 defines a set of records from the input data. Each record can include an input and a corresponding desired output. To generate an anomaly detection predictive model, for each record, the input is supplied by the input data and the desired output is an indicator that the data is either normal or not. In some implementations, the desired input can be included as a second input to generate the anomaly detection predictive model.

Subsequently received data is provided as a predictive request to the anomaly detection predictive model 220. The predictive request produces a predictive output which identifies whether the received data is normal. In some implementations, the anomaly detection model 202 provides a measure of the degree to which the subsequently received data is normal. Determining that an anomaly has occurred can include comparing the measure to a threshold value.

In some implementations, an anomaly detection predictive model may be associated with another trained predictive model. For example, the trained predictive model can receive a predictive request and input data and determine a predictive output for the input data. The associated anomaly detection predictive model can, either simultaneously or sequentially, determine if the input data is normal. Because the data processed by different trained predictive models may be inconsistent and disparate, a separate anomaly detection predictive model may be associated with each trained predictive model.

Figure 5:
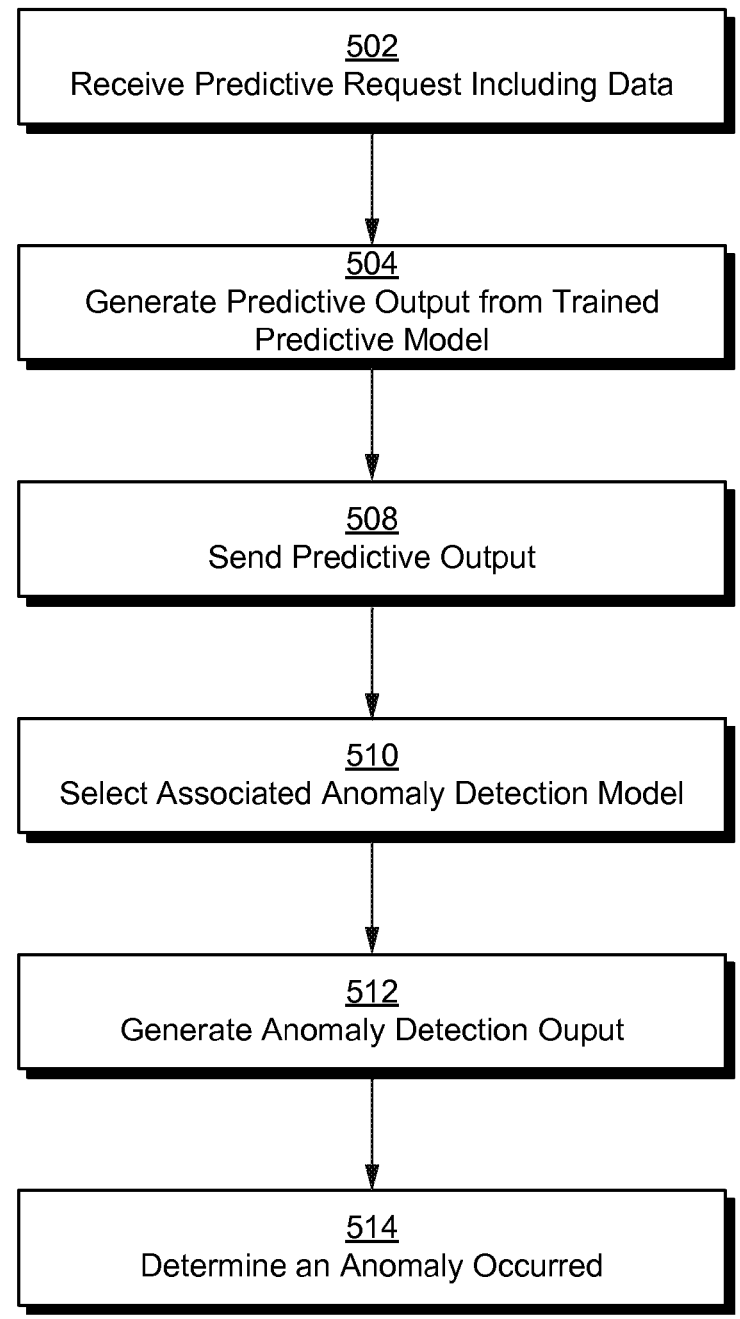
FIG. 5 is a flow chart describing an example process for detecting an anomaly.

In some implementations, detecting an anomaly is a time sensitive activity. For example, a modeling system that determines thermostat controls for an air conditioning system should respond quickly to data that indicates a sudden and dramatic increase in the temperature of the room (for example, an increase attributable to a fire in the room). FIG. 5 is a flow chart describing an example process 500 for detecting an anomaly. The process can be performed by the dynamic predictive modeling server system 206 of FIG. 2. For convenience, the process 500 will be described in terms of a system performing the process.

The dynamic predictive modeling server system 206 receives input data and a predictive request (Step 502) from a client computing system. In some implementations, the predictive request and input data may be received by the interface 208 of FIG. 2. The interface 208 can forward the input data and predictive request to the appropriate trained predictive model 218. In some implementations, the predictive request and input data may be received by the trained predictive model 218 directly.

The trained predictive model generates a predictive output based on the input data (Step 504). The predictive output may be sent to the client computing system (Step 508).

The dynamic predictive modeling server system selects an anomaly detection predictive model associated with the trained predictive model that was used to generate the predictive output in Step 508 (Step 510). The selected anomaly detection predictive model generates an output based on the input data received in Step 502 (Step 512). In some implementations, the output can be an indication of the degree to which the input data is normal. In some implementations, the output can include a score associated with the degree to which the input data is normal. For example, the output can include a score ranging between 0 and 1, 1 indicating the data is certainly normal and 0 indicating that the data is certainly not normal. In general, the scores will fall within the range.

The dynamic predictive modeling server can determine if an anomaly occurred (Step 514). In some implementations, determining that an anomaly has occurred includes determining that the score is beneath a threshold value. Once an anomaly has occurred the dynamic predictive modeling server can raise an alert, send an indicator that an anomaly has occurred, or create a recency weighted predictive model, as described below.

Anomalies can occur for a variety of different reasons. An anomaly can be an indication that a problem has occurred. For example, a sudden increase in temperature can be indicative of a fire. An anomaly can also be an indication of a change in the normal pattern of behavior. For example, a sudden increase in the number of individuals who select links associated with a type of boots may be indicative in a prolonged increase in popularity of the boots (e.g., a fad or trend). In scenarios in which the presence of an anomaly may be indicative of a trend, existing predictive models may prove to be less accurate until the models are trained using data that conforms to the new normal behavior.

Figure 6:
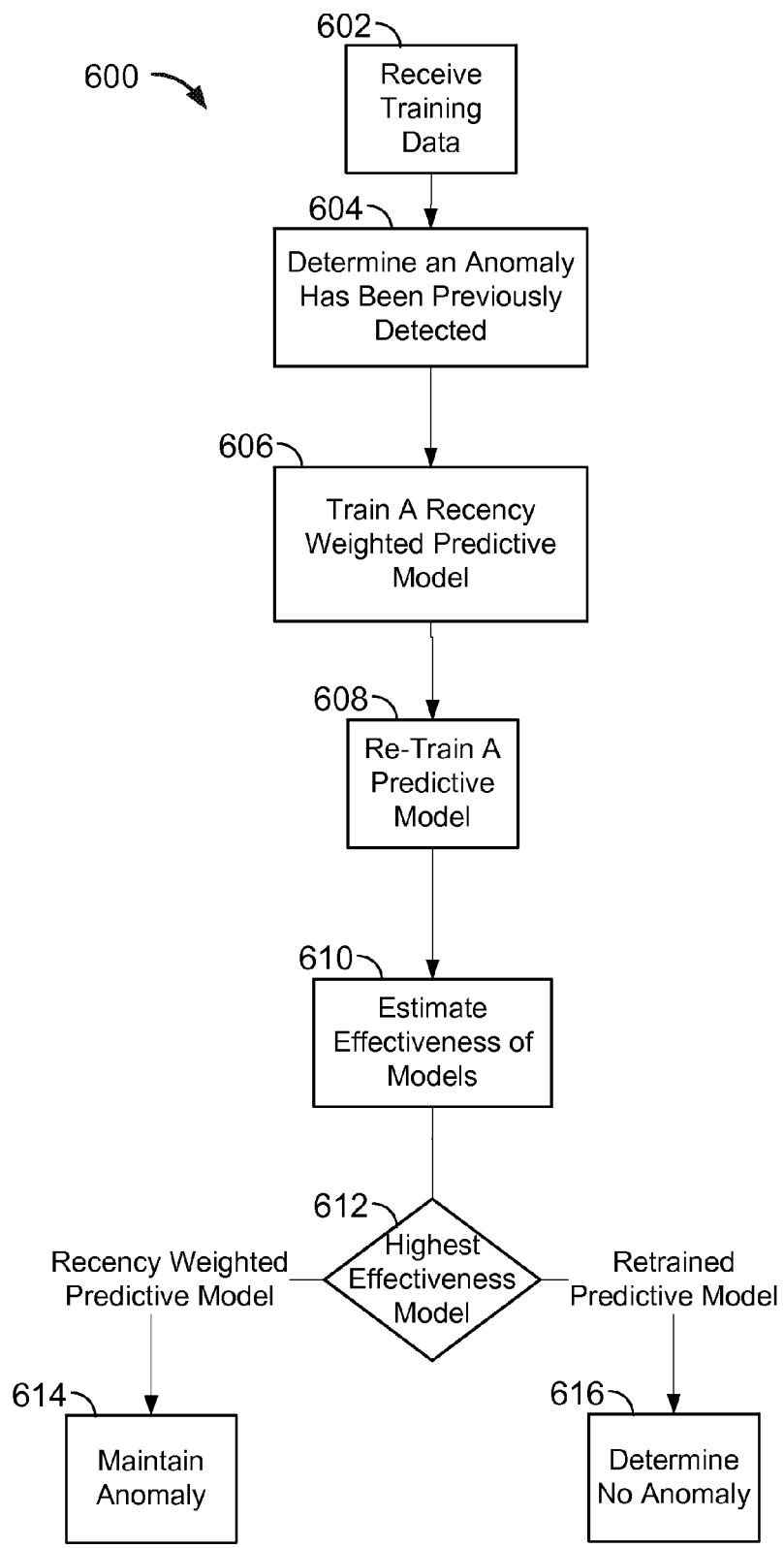
FIG. 6 is a flowchart of an example process for adjusting a predictive modeling system to more rapidly respond to a change in behavior patterns.

FIG. 6 is a flowchart of an example process 600 for adjusting a predictive modeling system to more rapidly respond to a change in behavior patterns. The process can be performed by the dynamic predictive modeling server system 206 of FIG. 2. Generally, the process occurs subsequent to detecting an anomaly as described above with respect to FIG. 5.

The process 600 receives training data that can be used to train an updateable predictive model (Step 602). In some implementations, a series of training data sets can be sent or uploaded by a client computing system 202 and stored in the training data queue 213 shown in FIG. 2. In some implementations, the training data queue 213 accumulates new training data until an update of the updateable trained predictive models included in the predictive model repository 215 is performed. In other implementations, the training data queue 213 only retains a fixed amount of data or is otherwise limited. In such implementations, once the training data queue 213 is full, an update can be performed automatically, a request can be sent to the client computing system 202 requesting instructions to perform an update, or training data in the queue 213 can be deleted to make room for more new training data.

The process 600 determines an anomaly has been previously detected in a predictive request submitted to the predictive model (Step 604). Determining an anomaly has been previously detected in a predictive request can include determining if an indicator has been sent or if a recency-weighted predictive model that corresponds to the predictive model exists in the predictive model repository 215.

In some implementations, upon detecting an anomaly the dynamic predictive modeling system 206 sets an indicator that can be later used to determine that the anomaly has occurred. In other implementations, the dynamic predictive modeling system creates a recency weighted predictive model upon detecting an anomaly has occurred. The existence of the recency weighted predictive model indicates that an anomaly has been identified in the input data corresponding to a predictive request to the trained predictive model, as described above with respect to FIG. 5.

The process 600 trains a recency weighted predictive model (Step 606). In some implementations, recency weighted predictive models can be obtained from the predictive model repository 215. If no recency weighted predictive model exists, a recency weighted predictive model can be generated by creating a clone of a corresponding trained predictive model from the predictive model repository 215. The recency weighted predictive model is updated with the training data stored in the training data queue 213. That is, recency weighted predictive models are generated using: the training data queue 213; the recency weighted predictive model; and the corresponding training functions that were initially used to train the updateable trained predictive models. As part of the training process the training data in the training data queue 213 is given increased significance. For example, each record in the training data may be processed multiple times to increase its significance.

The process 600 re-trains a trained predictive model (Step 608). The trained predictive model is updated with the training data stored in the training data queue 213. That is, retrained predictive models are generated using: the training data queue 213; the updateable trained predictive models obtained from the repository 215; and the corresponding training functions that were initially used to train the updateable trained predictive models, as described above. In some implementations, re-training the trained predictive model (Step 608) may occur in parallel with training the recency weighted predictive model (Step 606).

The process 600 estimates the effectiveness of the recency weighted predictive model and the retrained predictive model (Step 610). Each predictive model that is generated using the new training data can be scored to estimate the effectiveness of the model. That is, an effectiveness score can be generated, for example, in the manner described above.

In general, the effectiveness of a recency weighted predictive model and a retrained predictive model can be determined by comparing effectiveness scores for each model. Each trained predictive model in the repository 215 has an associated effectiveness score, as was described above. New effectiveness scores can be determined for the trained predictive models in the repository 215 as new training data is received. More recently received training data may be more representative of the input data that will be received with prediction requests from a particular client computing system. Accordingly, the performance of the trained predictive models using the most representative data may be a better indicator of the current accuracy than the effectiveness scores determined from the initial training data. The new effectiveness scores can be determined each time new training data is received, when a certain quantity of new data is received, at periodic intervals or otherwise. The new effectiveness scores can be determined based on a set of "test data". There are various techniques that can be used to determine what constitutes the test data and how the test data is used in the determination of the new effectiveness scores. In the example system shown, the model selection module 210 can determine the new effectiveness scores.

In some implementations, the test data used to determine the new effectiveness score of a trained predictive model is a combination of the initial training data and the new training data. The following is a formula that can be used to calculate the new effectiveness score after receiving n new data sets, where n is an integer greater than 0:

$$A_n = [w_0 C_0 + w_i C_1 + \ldots w_n C_n]/[T_0 + T_1 + \ldots T_n]$$

where:

$C_0$=number of correct predictions from initial cross-validation $C_1$=number of correct predictions from new data set (1)

$C_n$=number of correct predictions from new data set (n)

$w_0$=weight applied to the number of correct predictions from initial cross-validation $w_1$=weight applied to the number of correct predictions from new data set (1)

$w_n$=weight applied to the number of correct predictions from new data set (n)

n=integer greater than 0

$T_0$=total number of data samples in initial cross-validation $T_1$=total number of new data samples in new data set (1)

$T_n$=total number of new data samples in new data set (n)

$A_n$=new effectiveness score after receiving n new data sets

The above formula uses a tally (i.e., $C_0$) of the results from the initial cross-validation that was based on the initial training data and adds in the trained predictive model's score on each new data set received since then (i.e., $C_1 \ldots C_n$). The values of $C_0$ through $C_{n-1}$ are values that were calculated in previous iterations of determining the effectiveness score for a particular trained predictive model. These values can be stored and then later accessed by the model selection module 210 when the model selection module 210 is determining the new effectiveness score $A_n$. The values can be stored, for example, in the training data repository 214 or elsewhere. The value $C_n$ is a new value calculated by the model selection module at the time of determining the new effectiveness score $A_n$. The value $C_n$ is determined by testing the accuracy of the trained predictive model in predicting outputs that correspond to the inputs included in the $n^{th}$ new data set. The value of $C_n$ is determined by applying the inputs in the $n^{th}$ data set against a predictive model that was trained with the initial data and new data sets 1 through n−1, but not trained with the n$^{th}$ data set. Weights can be applied to the values of $C_0 \ldots C_n$ in order to increase the significance of more recent testing samples. That is more recent samples ($w_n$) in the testing set can be weighted to have to have a higher significance than older samples ($w_0, w_1$). For example, $w_0$ may be assigned a weight of 1, while $w_n$ may be assigned a weight of 1.5.

By way of illustrative example, consider Model A that was trained with a batch of 100 training samples and has an estimated 67% accuracy as determined from cross-validation. New training data is then received and the training data queue 213 has 10 new training samples. The new training data is used to test the accuracy of Model A. In this example, Model A gets 5 predictive outputs correct and 5 predictive outputs incorrect when tested with the 10 new training samples. The new effectiveness score that estimates the accuracy of Model A can be calculated as:

$$A_1 = [67+5]/[100+10] = 65\%.$$

In this particular example, Model A has performed less accurately with the 10 new training samples and the overall effectiveness score has decreased from 67% to 65%.

The new effectiveness score is determined before the trained predictive model is updated with the data in the training data queue 213 to generate a retrained predictive model, if the trained predictive model is updateable. The predictive model repository 215 is updated, that is, the updateable trained predictive models are retrained using the training data queue 213 (the static trained predictive models are unchanged) and each trained predictive model is associated with its corresponding new effectiveness score. The new effectiveness score was determined using the previous set of trained predictive models in the repository 215, i.e., before the updating, but was determined using the more recently received training data. That is, the effectiveness score was generated using the previous-iteration of trained predictive model (i.e., pre-updating with the new training data that is used as the test data).

The process 600 compares the effectiveness of the recency weighted predictive model to the retrained predictive model (Step 612). If the recency weighted predictive model is more effective (for example, if the recency weighted predictive model has a higher effectiveness score) then the system determines that the anomaly affects the predictive models (Step 614). For example, the process may determine that the re-trained predictive model has not accounted for the trend or change in normal patterns of data and therefore the recency weighted predictive model will produce better results.

If the re-trained predictive model is more effective, then the system determines that the anomaly does not affect the predictive models (Step 616). In some implementations, the recency weighted predictive models are deleted from the predictive model repository 215.

Figure 7:
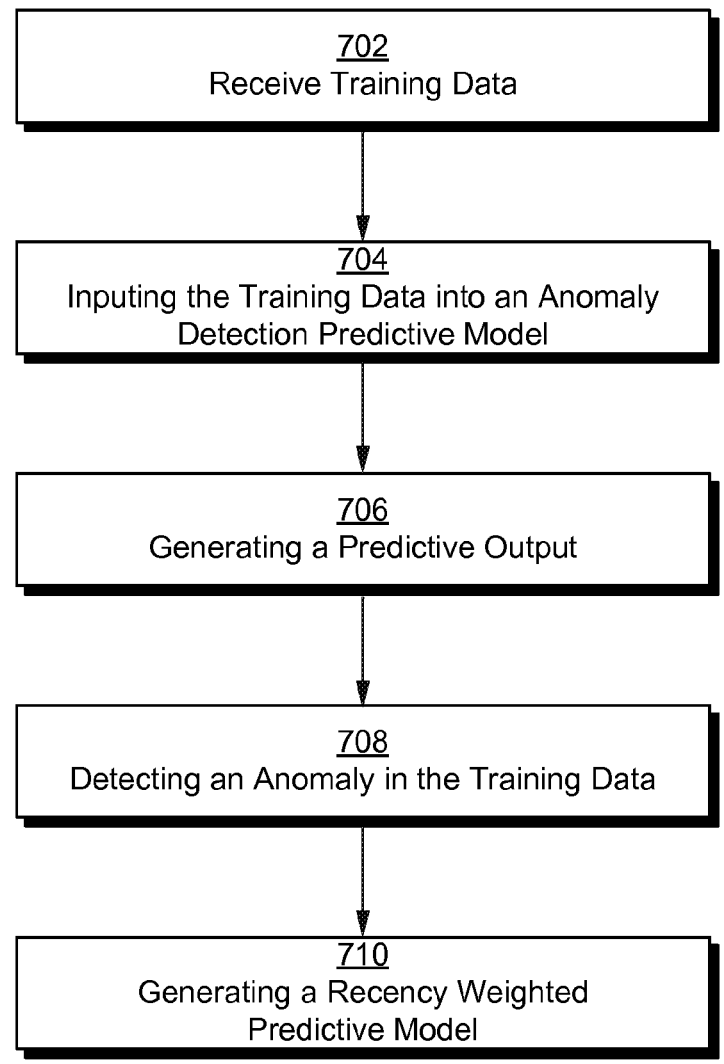
FIG. 7 is a flowchart of an example process for handing predictive requests.

FIG. 7 is a flow chart describing an example process 700 for detecting an anomaly in training data. The process can be performed by the dynamic predictive modeling server system 206 of FIG. 2. For convenience, the process 700 will be described in terms of a system performing the process. In some scenarios, it is not necessary to detect the occurrence of an anomaly immediately. For example, changes in user behavior will not necessarily affect the predictive models until the predictive models are retrained. In these scenarios, anomaly detection can be performed on the training data as opposed to on each predictive request.

The dynamic predictive modeling server system 206 receives training data (Step 702) from a client computing system. The training data can be a set of training data for an updateable predictive model. The training data can be separated into records that include an input and a desired output. In some implementations, the training data can be stored in a training data queue, for example, the training data queue 213 of FIG. 2.

The dynamic predictive modeling server system 206 inputs the training data (Step 704) into an anomaly detection predictive model. In some implementations, the anomaly detection predictive model was previously trained with normal data associated with the updatable predictive model associated with the training data.

The anomaly detection predictive model on the dynamic predictive modeling server system generates a predictive output. (Step 706). As discussed above, the output can be an indication of the degree to which the input data that is included in the training data sample is normal. In some implementations, the output can include a score associated with the degree to which the input data is normal. For example, the output can include a score ranging between 0 and 1, 1 indicating the data is certainly normal and 0 indicating that the data is certainly not normal. In general, the scores will fall within the range.

The dynamic predictive modeling server can detect an anomaly in the training data (Step 708). In some implementations, a single anomalous record in the training data may be sufficient to determine that the training data is anomalous. In other implementations, a threshold number of anomalous records must be detected to determine that the training data is anomalous. In other implementations, a sequence of sequential anomalous records are required to determine that the training data is anomalous.

Based on a determination that training data includes anomalous data, the dynamic predictive modeling server generates a recency weighted predictive model (step 710). In some implementations, the recency weighted predictive model is based on the updateable trained predictive model, a training function and training data that includes the received training data and previously received training data. The received training data is weighted differently than the previously received training data. As discussed above, the received training data is weighted to have greater significance than the previously received training data.

In some implementations, a retrained predictive model is generated, as described above. The efficiency of the retrained predictive model can be compared to the efficiency of the recency weighted predictive model. If the recency weighted predictive model has a higher efficiency, subsequent predictive requests can be directed to the recency weighted predictive model.

Figure 8:
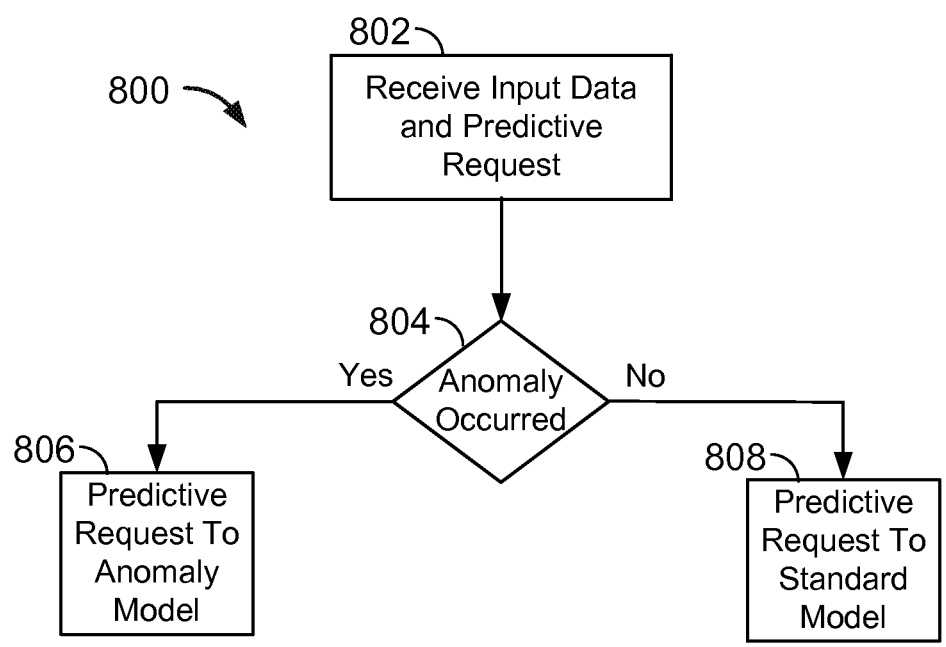
FIG. 8 is a flowchart of an example process for handing predictive requests.

FIG. 8 is a flowchart of an example process 800 for handing predictive requests. The process can be performed by the dynamic predictive modeling server system 206 of FIG. 2.

The process 800 receives input data and a predictive request (Step 802). The input data and predictive request can be received from a client computing system.

The process 800 determines an anomaly has occurred (Step 804).). In some implementations, upon detecting an anomaly the dynamic predictive modeling system 206 sets an indicator that can be later used to determine that the anomaly has occurred. In other implementations, upon detecting an anomaly in the input data corresponding to a predictive request to a trained predictive model. The existence of the recency weighted predictive model indicates that an anomaly has been identified in the input data corresponding to a predictive request to the trained predictive model.

If the process 800 determines that an anomaly has occurred, the process 800 sends the predictive request and input data to a recency weighted predictive model (Step 806). The recency weighted predictive model generates a predictive output.

If the process 800 determines than an anomaly has not occurred, the process 700 sends the predictive request and input data to a trained predictive model (Step 808). The trained predictive model generates a predictive output.

The predictive output is sends the predictive output to the client computing system.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   receiving training data for updating an updateable trained first predictive model;
   inputting the training data into a trained second predictive model and generating predictive output data;
   based on the predictive output data, detecting an anomaly in the training data as compared to previously received training data; and
   generating a retrained first predictive model based on the updateable trained first predictive model, a training function and training data that includes the received training data and previously received training data, wherein the received training data is weighted differently than the previously received training data based on the detected anomaly.

2. The method of claim 1 wherein the received training data comprises a set of records, each record comprising an input and a desired output.

3. The method of claim 2 wherein detecting an anomaly in the received training data includes detecting an anomaly in a threshold number of records of the set of records.

4. The method of claim 1 wherein detecting an anomaly in the received training data includes comparing a measure of the similarity between the received training data and the previously received training data to a threshold.

5. The method of claim 1 further comprising:
receiving a predictive request and input data from a client computing system;
generating a predictive output using the retrained first predictive model and the input data; and
sending the predictive output to the client computing system.

6. The method of claim 1 further comprising:
generating a retrained second predictive model based on the updateable trained first predictive model, the training function and training data that includes the received training data and previously received training data, wherein the received training data is weighted the same as the previously received training data based on the detected anomaly;
generating a first efficiency score for the retrained first predictive model;
generating a second efficiency score for the retrained second predictive model;
electing to use the retrained first predictive model in response to the first efficiency score being greater than the second efficiency score.

7. A computer-implemented method comprising:
receiving a predictive request for an updateable trained first predictive model, the predictive request including input data;
inputting the input data into a trained second predictive model and generating predictive output data, the trained second predictive model trained to detect an anomaly in input data as compared to previously received training data;
based on the predictive output data, detecting an anomaly in the input data as compared to the previously received input data;
receiving training data for updating the updateable trained first predictive model;
generating a retrained first predictive model based on the updateable trained first predictive model, a training function and training data that includes the received training data and previously received training data, wherein the received training data is weighted differently than the previously received training data based on the detected anomaly.

8. A non-transitory computer storage medium encoded with computer program instructions that when executed by one or more computers cause the one or more computers to perform operations comprising:
receiving training data for updating an updateable trained first predictive model;
inputting the training data into a trained second predictive model and generating predictive output data;
based on the predictive output data, detecting an anomaly in the training data as compared to previously received training data; and
generating a retrained first predictive model based on the updateable trained first predictive model, a training function and training data that includes the received training data and previously received training data, wherein the received training data is weighted differently than the previously received training data based on the detected anomaly.

9. The medium of claim 8 wherein the received training data comprises a set of records, each record comprising an input and a desired output.

10. The medium of claim 9 wherein detecting an anomaly in the received training data includes detecting an anomaly in a threshold number of records of the set of records.

11. The medium of claim 8 wherein detecting an anomaly in the received training data includes comparing a measure of the similarity between the received training data and the previously received training data to a threshold.

12. The medium of claim 8 further comprising:
receiving a predictive request and input data from a client computing system;
generating a predictive output using the retrained first predictive model and the input data; and
sending the predictive output to the client computing system.

13. The medium of claim 8 further comprising:
generating a retrained second predictive model based on the updateable trained first predictive model, the training function and training data that includes the received training data and previously received training data, wherein the received training data is weighted the same as the previously received training data based on the detected anomaly;
generating a first efficiency score for the retrained first predictive model;
generating a second efficiency score for the retrained second predictive model;
electing to use the retrained first predictive model in response to the first efficiency score being greater than the second efficiency score.

14. A non-transitory computer storage medium encoded with computer program instructions that when executed by one or more computers cause the one or more computers to perform operations comprising:
receiving a predictive request for an updateable trained first predictive model, the predictive request including input data;
inputting the input data into a trained second predictive model and generating predictive output data, the trained second predictive model trained to detect an anomaly in input data as compared to previously received training data;
based on the predictive output data, detecting an anomaly in the input data as compared to the previously received input data;
receiving training data for updating the updateable trained first predictive model;
generating a retrained first predictive model based on the updateable trained first predictive model, a training function and training data that includes the received training data and previously received training data, wherein the received training data is weighted differently than the previously received training data based on the detected anomaly.

15. A system comprising:
one or more computers and one or more storage devices storing instructions that are operable, when executed by the one or more computers, to cause the one or more computers to perform operations comprising:
A computer-implemented system comprising:
receiving training data for updating an updateable trained first predictive model;
inputting the training data into a trained second predictive model and generating predictive output data;
based on the predictive output data, detecting an anomaly in the training data as compared to previously received training data; and generating a retrained first predictive model based on the updateable trained first predictive model, a training function and training data that includes the received training data and previously received training data, wherein the received training data is weighted differently than the previously received training data based on the detected anomaly.

16. The system of claim 15 wherein the received training data comprises a set of records, each record comprising an input and a desired output.

17. The system of claim 16 wherein detecting an anomaly in the received training data includes detecting an anomaly in a threshold number of records of the set of records.

18. The system of claim 15 wherein detecting an anomaly in the received training data includes comparing a measure of the similarity between the received training data and the previously received training data to a threshold.

19. The system of claim 15 further comprising:
receiving a predictive request and input data from a client computing system;
generating a predictive output using the retrained first predictive model and the input data; and
sending the predictive output to the client computing system.

20. The system of claim 15 further comprising:
generating a retrained second predictive model based on the updateable trained first predictive model, the training function and training data that includes the received training data and previously received training data, wherein the received training data is weighted the same as the previously received training data based on the detected anomaly;
generating a first efficiency score for the retrained first predictive model;
generating a second efficiency score for the retrained second predictive model;
electing to use the retrained first predictive model in response to the first efficiency score being greater than the second efficiency score.

21. A system comprising:
one or more computers and one or more storage devices storing instructions that are operable, when executed by the one or more computers, to cause the one or more computers to perform operations comprising:
receiving a predictive request for an updateable trained first predictive model, the predictive request including input data;
inputting the input data into a trained second predictive model and generating predictive output data, the trained second predictive model trained to detect an anomaly in input data as compared to previously received training data;
based on the predictive output data, detecting an anomaly in the input data as compared to the previously received input data;
receiving training data for updating the updateable trained first predictive model;
generating a retrained first predictive model based on the updateable trained first predictive model, a training function and training data that includes the received training data and previously received training data, wherein the received training data is weighted differently than the previously received training data based on the detected anomaly.

* * * * *